US012134486B2

(12) United States Patent
Imai

(10) Patent No.: US 12,134,486 B2
(45) Date of Patent: Nov. 5, 2024

(54) MOVING BODY, SYSTEM, COMPUTER READABLE RECORDING MEDIUM, AND CONTROL METHOD

(71) Applicant: SoftBank Corp., Tokyo (JP)

(72) Inventor: Hiromichi Imai, Tokyo (JP)

(73) Assignee: SoftBank Corp., Tokyo (JP)

( * ) Notice: Subject to any disclaimer, the term of this patent is extended or adjusted under 35 U.S.C. 154(b) by 438 days.

(21) Appl. No.: 17/686,424

(22) Filed: Mar. 4, 2022

(65) Prior Publication Data
US 2022/0185474 A1 Jun. 16, 2022

Related U.S. Application Data

(63) Continuation of application No. PCT/JP2020/002805, filed on Jan. 27, 2020.

(30) Foreign Application Priority Data

Sep. 20, 2019 (JP) ................. 2019-171742

(51) Int. Cl.
B64U 10/13 (2023.01)
H04B 10/11 (2013.01)
H04B 10/114 (2013.01)
(52) U.S. Cl.
CPC ............ B64U 10/13 (2023.01); H04B 10/11 (2013.01); H04B 10/1143 (2013.01)
(58) Field of Classification Search
CPC .... B64U 10/13; B64U 10/60; B64U 2101/30; B64U 2201/104; G08G 1/09; G08G 3/00;
(Continued)

(56) References Cited

U.S. PATENT DOCUMENTS 10,202,190 B2 * 2/2019 Tao ...................... G05D 1/0061
10,558,224 B1 * 2/2020 Lin ...................... G05D 1/0285
(Continued)

FOREIGN PATENT DOCUMENTS

JP 2018016203 A 2/2018
JP 2018166256 A 10/2018
(Continued)

OTHER PUBLICATIONS (ISA/237) Written Opinion of the International Search Authority for International Patent Application No. PCT/JP2020/002805, issued/mailed by the Japan Patent Office on Mar. 24, 2020.

Primary Examiner — Tyler J Lee

(57) ABSTRACT

There is provided a moving body including: an optical wireless communication unit configured to execute an optical wireless communication with another moving body; an object detection unit configured to detect an object around an own moving body; an object information transmission unit configured to transmit, to the other moving body, first object information including location information of the object, by the optical wireless communication or a radio wave communication; an object information receiving unit configured to receive, from the other moving body, second object information including location information of an object around the other moving body, by the optical wireless communication or the radio wave communication; and a movement control unit configured to control, based on the first object information and the second object information, a movement of the own moving body such that an object is not located on an optical axis of the optical wireless communication.

20 Claims, 8 Drawing Sheets

(58) Field of Classification Search
CPC ... G08G 5/00; G08G 7/00; G08G 9/00; H04B 10/11; H04B 10/1143; H04B 13/02
See application file for complete search history.

(56) References Cited

U.S. PATENT DOCUMENTS

| | | | |
|---|---|---|---|
| 10,567,079 B1* | 2/2020 | Inskeep | H03M 13/09 |
| 11,521,493 B2* | 12/2022 | Vaughn | G08G 1/166 |
| 2015/0206434 A1* | 7/2015 | Shimotani | G08G 1/163 |
| | | | 701/1 |
| 2016/0148506 A1* | 5/2016 | De Oliveira | G08G 1/0133 |
| | | | 340/905 |
| 2018/0149491 A1* | 5/2018 | Tayama | G08G 1/165 |
| 2018/0222582 A1 | 8/2018 | Ohata | |
| 2019/0011912 A1* | 1/2019 | Lockwood | G05D 1/0231 |
| 2019/0051180 A1* | 2/2019 | Vaughn | G05D 1/0088 |
| 2019/0176967 A1 | 6/2019 | Ohata | |
| 2020/0177276 A1* | 6/2020 | Lakshmanan | H04B 10/112 |

FOREIGN PATENT DOCUMENTS

| | | | |
|---|---|---|---|
| WO | 2017017984 A1 | 2/2017 | |
| WO | 2017170148 A1 | 10/2017 | |

* cited by examiner

MOVING BODY, SYSTEM, COMPUTER READABLE RECORDING MEDIUM, AND CONTROL METHOD

CONTROL METHOD

The contents of the following Japanese patent application(s) are incorporated herein by reference:
NO. 2019-171742 filed in JP on Sep. 20, 2019
NO. PCT/JP2020/002805 filed in WO on Jan. 27, 2020

BACKGROUND

1. Technical Field

The present invention relates to a moving body, a system, a computer readable recording medium, and a control method.

2. Related Art

A moving body with an optical wireless communication function is known. (For example, refer to Patent Document 1).

CITATION LIST

Patent Document

[Patent Document 1] Japanese Patent Application Publication No. 2018-166256

3. Technical Problem

It is desirable to provide a technology that supports a stable execution of an optical wireless communication.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential for means to solve the problem in the invention.

Figure 1:
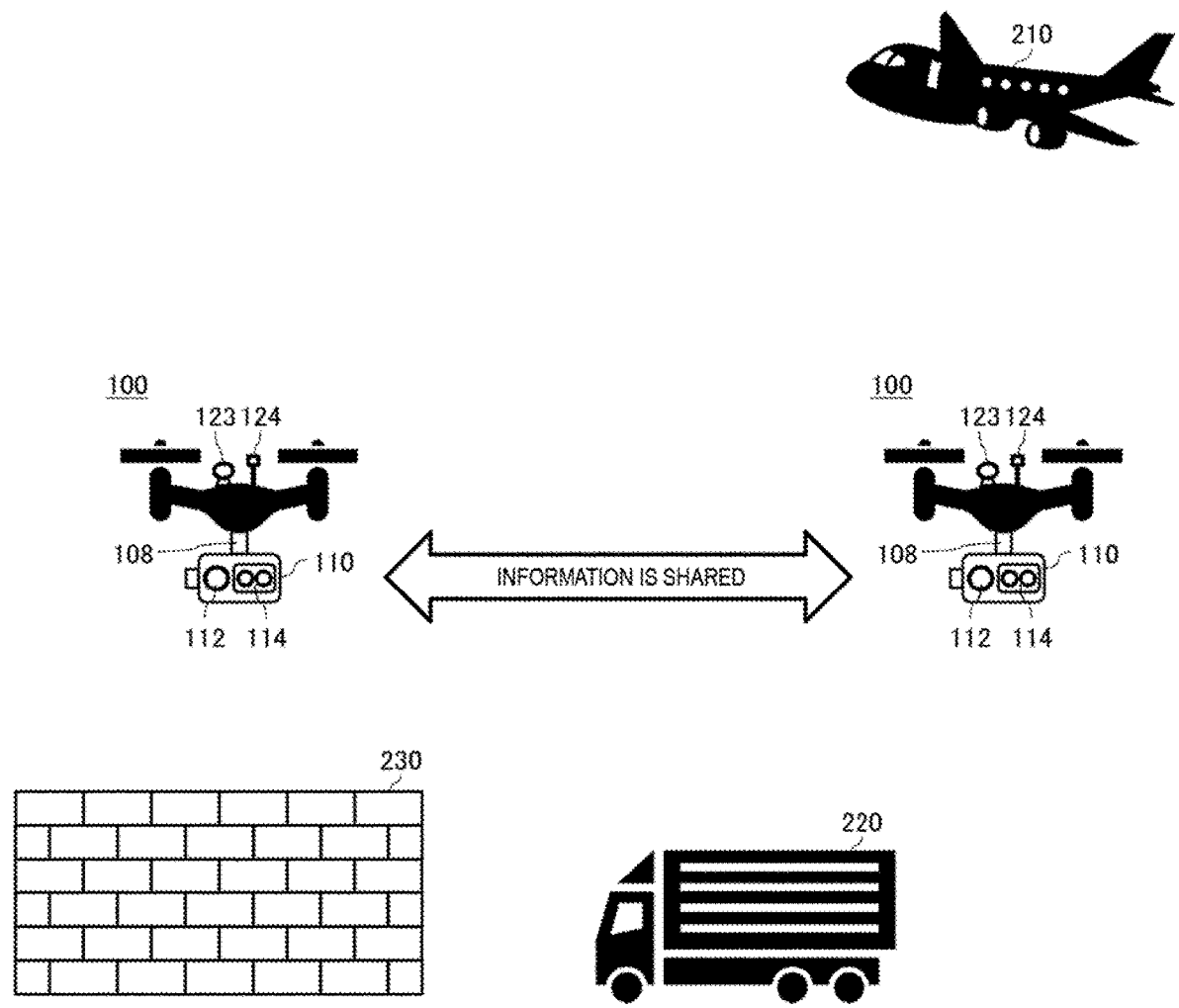
FIG. 1 schematically shows an example of an unmanned aerial vehicle 100.

FIG. 1 schematically shows an example of an unmanned aerial vehicle 100. The unmanned aerial vehicle 100 may be an example of a moving body. The unmanned aerial vehicle 100 has a function of executing an optical wireless communication with another unmanned aerial vehicle 100.

The unmanned aerial vehicle 100 according to the present embodiment detects an object around the unmanned aerial vehicle 100, and shares object information including location information of the object with the other unmanned aerial vehicle 100 by the optical wireless communication or a radio wave communication, and the unmanned aerial vehicle 100 controls, based on the shared information, a movement of the unmanned aerial vehicle 100 such that the object is not located on an optical axis of the optical wireless communication between the unmanned aerial vehicle 100 and the other unmanned aerial vehicle 100.

The optical wireless communication has features such as a capability of a high speed communication and a capability of a communication even in an environment such an underwater environment where the radio wave communication cannot be executed, and is effective communication means; however, there is a problem that the communication is not possible when the optical axis of the optical wireless communication is blocked. The unmanned aerial vehicle 100 according to the present embodiment is equipped with a sensor for detecting the object around the unmanned aerial vehicle 100, shares the information of the detected object with a communication partner of the optical wireless communication, recognizes an object which blocks the optical axis or which is likely to block the optical axis, and controls a movement of an own aerial vehicle to secure a line of sight for the optical axis.

The unmanned aerial vehicle 100 shares, for example, the information of the detected object with the communication partner by the optical wireless communication. In addition, the unmanned aerial vehicle 100 may share the information of the detected object with the communication partner by the radio wave communication. For example, by directly communicating with the communication partner by the radio wave communication, the unmanned aerial vehicle 100 shares the information of the detected object with the communication partner. A method for the radio wave communication may be any method. Examples of the method of the radio wave communication include a WiFi (registered trademark) communication, a Bluetooth (registered trademark) communication, a communication performed between aerial vehicles by using a 920 MHz band, and the like. In addition, for example, by communicating with the communication partner by the radio wave communication via a wireless base station, a WiFi access point, and the like, the unmanned aerial vehicle 100 may share the information of the detected object with the communication partner. A mobile communication system to which the unmanned aerial vehicle 100 conforms may be any of a 3G (3rd Generation) communication system, an LTE (Long Term Evolution) communication system, a 5G (5th Generation) communication system, and a 6G (6th Generation) communication system and a communication system of a subsequent generation.

The unmanned aerial vehicle 100 includes a gimbal 108 and a communication unit 110 supported to be capable of rotating by the gimbal 108. The gimbal 108 is a gimbal having one or more axes. The gimbal 108 is, for example, a biaxial gimbal or a triaxial gimbal. The communication unit 110 has a camera 112 and an optical wireless communication unit 114. In addition, the unmanned aerial vehicle 100 includes millimeter wave radar 123 and LiDAR (Light Detection and Ranging, Laser Imaging Detection and Ranging) 124.

The camera 112, the millimeter wave radar 123, and the LiDAR 124 may be examples of sensors that detect objects around the unmanned aerial vehicle 100. The unmanned aerial vehicle 100 may include only one of these, or may include only two of them. In addition, the unmanned aerial vehicle 100 may include a sensor other than these. For example, the unmanned aerial vehicle 100 includes an ultrasonic sensor. Also, for example, the unmanned aerial vehicle 100 includes sonar.

The optical wireless communication unit 114 has a light emitting port 116 and a light receiving port 118. A type of light used for the optical wireless communication by the optical wireless communication unit 114 may be any type, and for example, light having a wavelength between that of infrared light and that of visible light is used.

For example, when the visible light is used, LEDs (Light Emitting Diodes) of various wavelengths can be obtained at a low cost, and thus it is easy to widen a bandwidth by superimposing multiple wavelengths, and a manufacturing cost of the unmanned aerial vehicle 100 can be reduced. In addition, for example, when the infrared light is used, a wavelength of the infrared light is longer than that of the visible light, and thus it is possible to reach a long distance with a small output. In addition, it is safe for eyes and is invisible to naked eyes, and thus it is possible to conceal the communication.

The camera 112 captures an image in a direction of the optical wireless communication of the optical wireless communication unit 114. The camera 112 captures, for example, the image in a direction of light emitting by the light emitting port 116. A vector in the direction of the optical wireless communication of the optical wireless communication unit 114 and a vector in a main direction of image capturing by the camera 112 may be the same. The main direction of image capturing by the camera 112 is, for example, a direction of an optical axis of a lens included in the camera 112.

The optical wireless communication has high directivity, and the communication is not possible unless optical axes of communication ports of communication targets match with each other. The unmanned aerial vehicle 100 according to the present embodiment has a mechanism for automatically matching an optical axis of the optical wireless communication unit 114 with an optical axis of an optical wireless communication unit of the communication partner.

For example, the unmanned aerial vehicle 100 (may be described as the own aerial vehicle) and the unmanned aerial vehicle 100 as the communication partner (may be described as a communication partner's aerial vehicle) analyze captured images which are captured by the respective cameras 112 to recognize each other, and track each other by continuously adjusting angles of the communication units 110 by the gimbal 108. In addition, when it is determined that the optical axes of the optical wireless communication units 114 match with each other by the images captured by the cameras 112, the own aerial vehicle and the communication partner's aerial vehicle establish an optical wireless communication link.

After the optical wireless communication link is established, the own aerial vehicle and the communication partner's aerial vehicle mutually recognize the captured images which are captured by the respective cameras 112, continue to track each other by adjusting the angles of the communication units 110 by the gimbal 108, and maintain a state in which the optical axes of the optical wireless communication units 114 match with each other.

The unmanned aerial vehicle 100 detects, by each sensor, the object around the unmanned aerial vehicle 100. The unmanned aerial vehicle 100 detects, for example, the object in front of the unmanned aerial vehicle 100 by the camera 112. In addition, the unmanned aerial vehicle 100 detects, for example, the object in all circumferential directions of the unmanned aerial vehicle 100 by the millimeter wave radar 123. In addition, the unmanned aerial vehicle 100 detects, for example, the object in all circumferential directions of the unmanned aerial vehicle 100 by the LiDAR 124.

The unmanned aerial vehicle 100 may acquire the location information indicating a location of the object. The unmanned aerial vehicle 100 acquires, for example, the location information indicating a relative location of the object with a location of the unmanned aerial vehicle 100 as a starting point. In addition, the unmanned aerial vehicle 100 may acquire an absolute location of the object. The unmanned aerial vehicle 100 may acquire a movement state of the object. For example, the unmanned aerial vehicle 100 acquires a movement direction of the object. In addition, for example, the unmanned aerial vehicle 100 acquires a movement speed of the object.

The unmanned aerial vehicle 100 acquires, for example, the location information of the object and the movement state of the object by analyzing the captured images continuously captured by the camera 112. In addition, the unmanned aerial vehicle 100 may acquire the location information of the object and the movement state of the object from the LiDAR 124.

The LiDAR 124 may be so-called image LiDAR. In addition, the LiDAR 124 may be so-called FMCW (Frequency-Modulated Continuous Wave) LiDAR. In addition, the LiDAR 124 may be Doppler LiDAR.

In the example shown in FIG. 1, one unmanned aerial vehicle 100 transmits object information of a wall 230 to the other unmanned aerial vehicle 100 by the optical wireless communication or the radio wave communication. In addition, the other unmanned aerial vehicle 100 transmits, to the one unmanned aerial vehicle 100, object information of an aircraft 210 and object information of a vehicle 220 by the optical wireless communication or the radio wave communication. This makes it possible for both of the unmanned aerial vehicles 100 to grasp a situation of the aircraft 210, the vehicle 220, and the wall 230.

Figure 2:
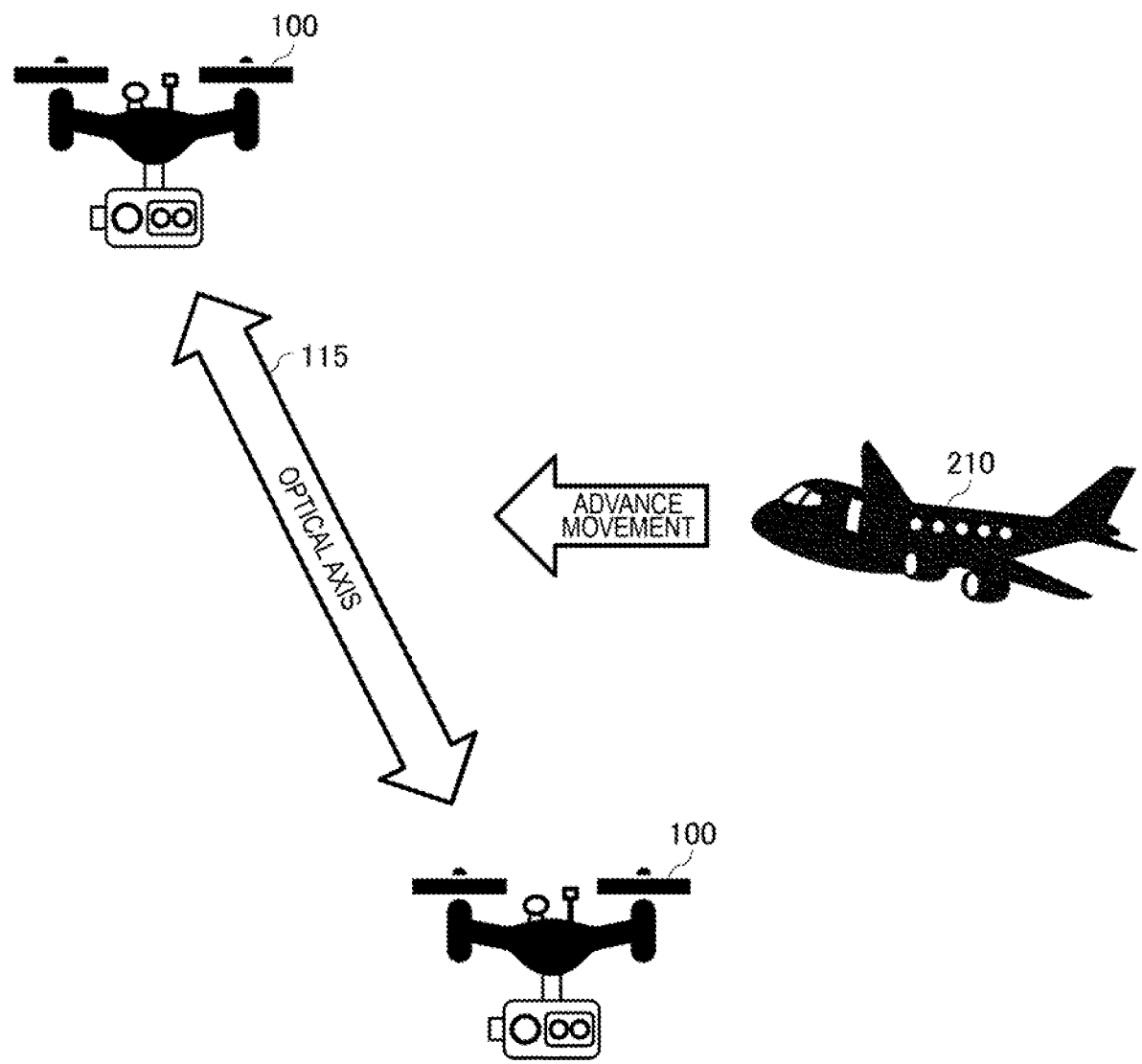
FIG. 2 schematically shows an example of a movement of the unmanned aerial vehicle 100.
Figure 3:
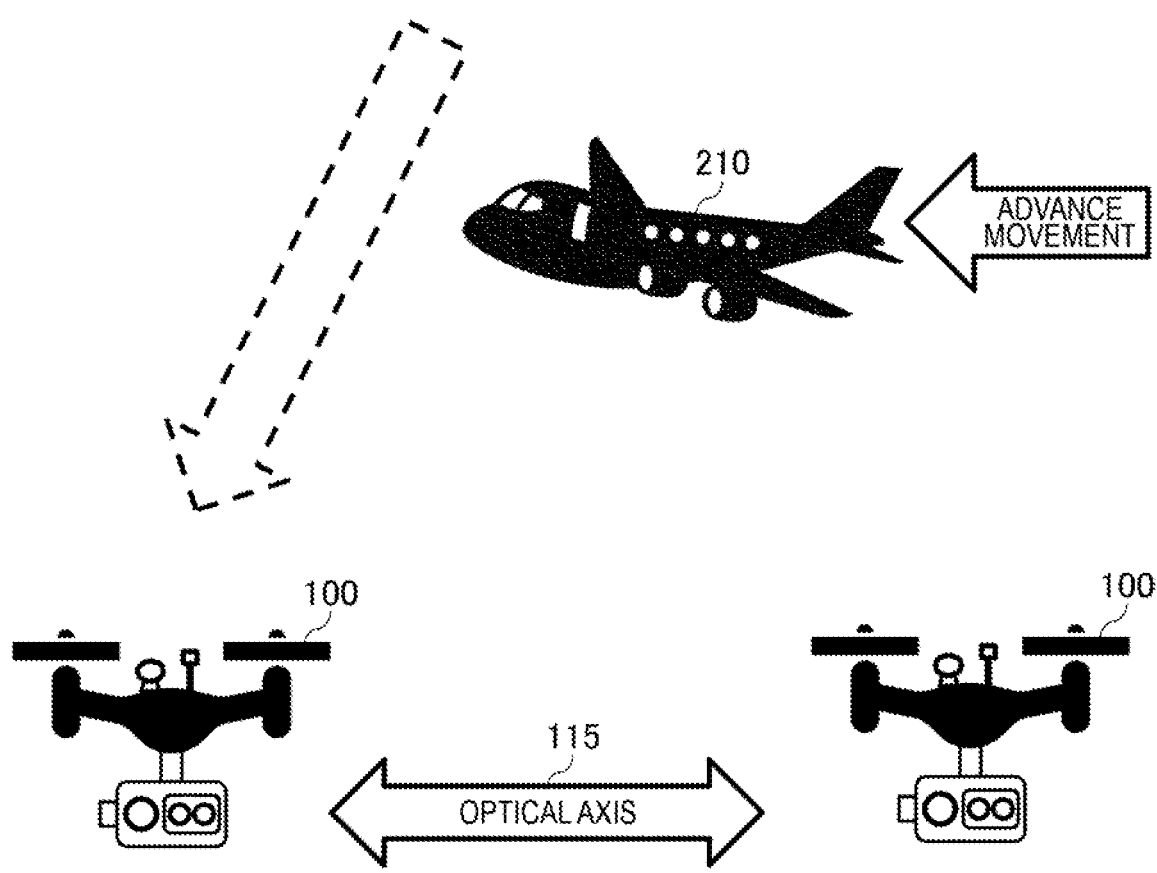
FIG. 3 schematically shows an example of the movement of the unmanned aerial vehicle 100.

FIG. 2 and FIG. 3 schematically show examples of the movement of the unmanned aerial vehicle 100. Here, a case where, a first unmanned aerial vehicle 100 and a second unmanned aerial vehicle 100 share the object information of objects around the first unmanned aerial vehicle 100 and the second unmanned aerial vehicle 100, and the first unmanned aerial vehicle 100 moves such that the aircraft 210 is not located on an optical axis 115 of the optical wireless communication between the first unmanned aerial vehicle 100 and the second unmanned aerial vehicle 100, will be described as an example.

The first unmanned aerial vehicle 100 and the second unmanned aerial vehicle 100 predict, by the shared object information, entering of the aircraft 210 into the optical axis 115. The first unmanned aerial vehicle 100 and the second unmanned aerial vehicle 100 share, by the optical wireless communication, the information that the aircraft 210 is about to enter the optical axis 115, and decide which one moves.

The first unmanned aerial vehicle 100 and the second unmanned aerial vehicle 100 may decide that either one moves, or may decide that both move. Here, the description will be continued on the assumption that it is decided that the first unmanned aerial vehicle 100 moves.

The first unmanned aerial vehicle 100 moves such that the aircraft 210 is not located on the optical axis 115. The first unmanned aerial vehicle 100 may refer to the shared object information to decide a movement path that does not collide with another object, while maintaining the optical wireless communication with the second unmanned aerial vehicle 100, and move in the decided movement path. By the first unmanned aerial vehicle 100 moving, it is possible to prevent the optical wireless communication from being blocked by the aircraft 210, and it is possible to maintain the optical wireless communication.

Even when the optical axis is blocked by the object, it is possible for the first unmanned aerial vehicle 100 and the second unmanned aerial vehicle 100 to share the location information with each other by the radio wave communication, and to reconnect to the optical wireless communication by moving in a direction to escape from the blocked state.

Figure 4:
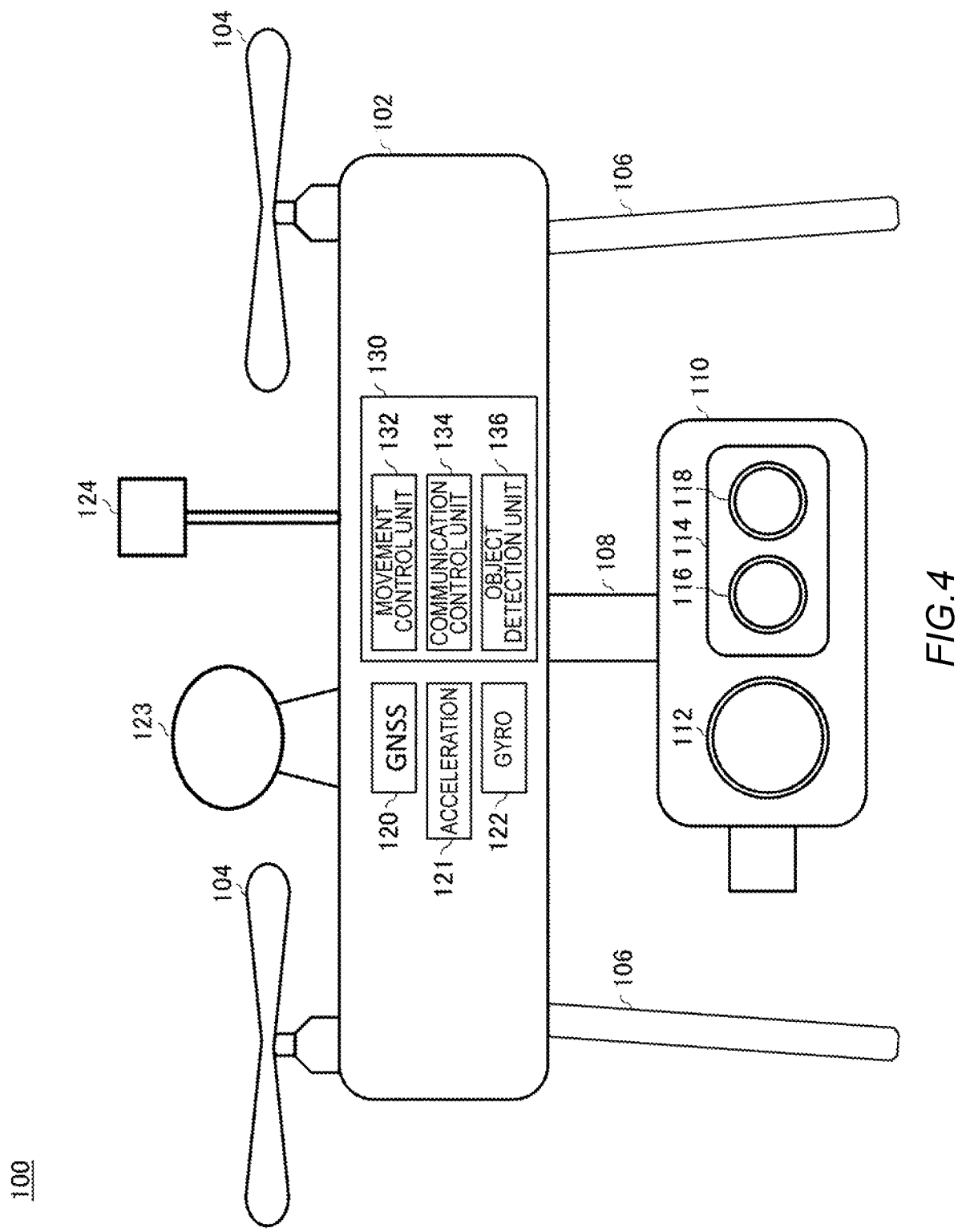
FIG. 4 schematically shows an example of a configuration of the unmanned aerial vehicle 100.

FIG. 4 schematically shows an example of a configuration of the unmanned aerial vehicle 100. The unmanned aerial vehicle 100 includes a main body unit 102, a propeller 104, a leg unit 106, the gimbal 108, the communication unit 110, the millimeter wave radar 123, and the LiDAR 124.

The main body unit 102 includes a GNSS unit 120, an acceleration sensor 121, a gyro sensor 122, and a control device 130. The GNSS unit 120 identifies the location of the unmanned aerial vehicle 100 and outputs location information. The acceleration sensor 121 detects acceleration. The gyro sensor 122 detects an angular velocity.

The control device 130 controls the unmanned aerial vehicle 100. The control device 130 includes a movement control unit 132, a communication control unit 134, and an object detection unit 136.

The movement control unit 132 controls the movement of the unmanned aerial vehicle 100. The movement control unit 132 executes a flight control of the unmanned aerial vehicle 100 by controlling the propeller 104 based on information which is output from various sensors. The movement control unit 132 may control the movement of the unmanned aerial vehicle 100 according to an operation from an outside. In addition, the movement control unit 132 may refer to information indicating an operation plan, and control the movement of the unmanned aerial vehicle 100 for the unmanned aerial vehicle 100 to fly on a path specified by the operation plan.

The communication control unit 134 controls the communication of the unmanned aerial vehicle 100. The communication control unit 134 controls the optical wireless communication by the optical wireless communication unit 114.

The communication control unit 134 may perform the radio wave communication with the other unmanned aerial vehicle 100 via an antenna (not shown). The communication control unit 134 performs the radio wave communication with the other unmanned aerial vehicle 100, for example, by the WiFi communication. In addition, the communication control unit 134 performs the radio wave communication with the other unmanned aerial vehicle 100, for example, by the Bluetooth communication. In addition, the communication control unit 134 performs the radio wave communication with the other unmanned aerial vehicle 100, for example, by the communication performed between the aerial vehicles by using the 920 MHz band.

The communication control unit 134 may communicate with the wireless base station via an antenna (not shown). The communication control unit 134 may execute the communication, via the wireless base station, via a mobile communication network. The mobile communication network may conform to any of the 3G (3rd Generation) communication system, the LTE (Long Term Evolution) communication system, the 5G (5th Generation) communication system, and the 6G (6th Generation) communication system and the communication system of the subsequent generation. The communication control unit 134 may access the mobile communication network via the WiFi (registered trademark) access point or the like.

The object detection unit 136 detects the object around the unmanned aerial vehicle 100 (may be described as the own aerial vehicle). The object detection unit 136 may detect the object around the own aerial vehicle by using at least any of the camera 112, the millimeter wave radar 123, and the LiDAR 124.

The object detection unit 136 may detect the movement state of the object. The object detection unit 136 detects, for example, the movement direction of the object. In addition, the object detection unit 136 detects, for example, the movement speed of the object.

The communication control unit 134 may transmit the object information (may be described as object information of the own aerial vehicle) including the location information of the object detected by the object detection unit 136, to the unmanned aerial vehicle 100 (may be described as the communication partner's aerial vehicle) that is the communication partner of the optical wireless communication. The communication control unit 134 transmits, for example, the object information of the own aerial vehicle to the communication partner's aerial vehicle by the optical wireless communication by the optical wireless communication unit 114. In addition, the communication control unit 134 transmits, for example, the object information of the own aerial vehicle to the communication partner's aerial vehicle by the radio wave communication. The location information of the object may indicate the relative location of the object with the own aerial vehicle as a starting point. In addition, the location information of the object may indicate the absolute location. The communication control unit 134 may transmit the object information further including the movement state of the object detected by the object detection unit 136, to the communication partner's aerial vehicle. The communication control unit 134 may be an example of an object information transmission unit.

The communication control unit 134 may also receive the object information (may be described as object information of another aerial vehicle) including the location information of the object around the communication partner's aerial vehicle, from the communication partner's aerial vehicle. The communication control unit 134 receives, for example, the object information of the other aerial vehicle from the communication partner's aerial vehicle by the optical wireless communication by the optical wireless communication unit 114. In addition, the communication control unit 134 receives, for example, the object information of the other aerial vehicle from the communication partner's aerial vehicle by the radio wave communication. The location information of the object may indicate the relative location of the object with the communication partner's aerial vehicle as a starting point. In addition, the location information of the object may indicate the absolute location. The communication control unit 134 may receive the object information further including the movement state of the object, from the communication partner's aerial vehicle. The communication control unit 134 may be an example of an object information receiving unit.

Based on the object information of the own aerial vehicle and the object information of the other aerial vehicle, the movement control unit 132 may control the movement of the own aerial vehicle such that the object is not located on the optical axis of the optical wireless communication by the optical wireless communication unit 114. The movement control unit 132 may use the location information and the movement state of the object included in the object information of the own aerial vehicle, and the location information and the movement state of the object included in the object information of the other aerial vehicle, and predict entering of the object into the optical axis 115 of the optical wireless communication unit 114. Here, the entering includes approaching of the object into the optical axis 115 by the movement, approaching of the object into the optical axis 115 by the movement of at least any of the own aerial vehicle and the communication partner's aerial vehicle, approaching of the object into the optical axis 115 by movements of the object, and at least any of the own aerial vehicle and the communication partner's aerial vehicle.

The movement control unit 132 may control, based on a location of an approaching object that is an object which is predicted to enter the optical axis 115 of the optical wireless communication unit 114, the movement of the own aerial vehicle such that the approaching object is not located on the optical axis 115 of the optical wireless communication unit 114. Based on the location, a movement direction, and a movement speed of the approaching object, the movement control unit 132 may control the movement of the own aerial vehicle such that the approaching object is not located on the optical axis 115 of the optical wireless communication unit 114.

The movement control unit 132 decides which one, between the own aerial vehicle and the communication partner's aerial vehicle, moves by communicating with the communication partner's aerial vehicle by the optical wireless communication by the optical wireless communication unit 114 via the communication control unit 134, and the movement control unit 132 may control, when deciding that only the own aerial vehicle or both move, the movement of the own aerial vehicle such that the approaching object is not located on the optical axis 115 of the optical wireless communication unit 114.

The movement control unit 132 may decide which one, between the own aerial vehicle and the communication partner's aerial vehicle, moves based on the location of the approaching object, a location relationship between the own aerial vehicle and the object around the own aerial vehicle, and a location relationship between the communication partner's aerial vehicle and the object around the communication partner's aerial vehicle. When the approaching object is moving, the movement control unit 132 may decide which one, between the own aerial vehicle and the communication partner's aerial vehicle, moves based on the location, the movement direction, and the movement speed of the approaching object, the location relationship between the own aerial vehicle and the object around the own aerial vehicle, and the location relationship between the communication partner's aerial vehicle and the object around the communication partner's aerial vehicle.

For example, between the own aerial vehicle and the communication partner's aerial vehicle, the movement control unit 132 decides that one, which is closer to the approaching object, performs the movement (may be described as a blocking prevention movement) to prevent the approaching object from entering the optical axis 115. Between the own aerial vehicle and the communication partner's aerial vehicle, the movement control unit 132 may decide that one around which the number of the objects is small performs the blocking prevention movement. When only one of the own aerial vehicle and the communication partner's aerial vehicle is flying on the path specified in the operation plan, the movement control unit 132 may decide that one which is not flying on the path specified by the operation plan performs the blocking prevention movement.

For example, when the approaching object is stationary and the approaching object is about to enter the optical axis 115 of the optical wireless communication unit 114 by the movement of the own aerial vehicle and the communication partner's aerial vehicle, the movement control unit 132 decides that between the own aerial vehicle and the communication partner's aerial vehicle, one which is moving close to the approaching object performs the blocking prevention movement. In addition, for example, when the approaching object is moving, the movement control unit 132 decides that between the own aerial vehicle and the communication partner's aerial vehicle, one which is moving with a movement vector closer to a movement vector of the approaching object performs the blocking prevention movement.

When deciding that the own aerial vehicle performs the blocking prevention movement, the movement control unit 132 moves the own aerial vehicle in a direction in which the object around the own aerial vehicle does not exist. In addition, the movement control unit 132 moves the own aerial vehicle in a direction which does not deviate from an area regulated by law. For example, the movement control unit 132 moves the own aerial vehicle in a direction which does not enter a DID (Densely Inhabited District), a sky above an airport, and the like.

In addition, when the own aerial vehicle is flying on the path specified in the operation plan, the movement control unit 132 performs the blocking prevention movement in a direction along the path. When it is not possible to avoid the blocking of the optical axis 115 by the approaching object in the direction along the path, the movement control unit 132 moves the own aerial vehicle in a direction in which it is easy to return to the path. For example, the movement control unit 132 moves the unmanned aerial vehicle 100 in a vector direction in which a change with respect to a movement vector along the path is smaller. For example, when the movement is performed in a direction completely opposite to the movement direction along the path, a load for returning to the path increases; however, by moving in a direction in which an angle change is smaller with respect to the movement direction along the path, it is possible to make it easier to return to the path.

Figure 5:
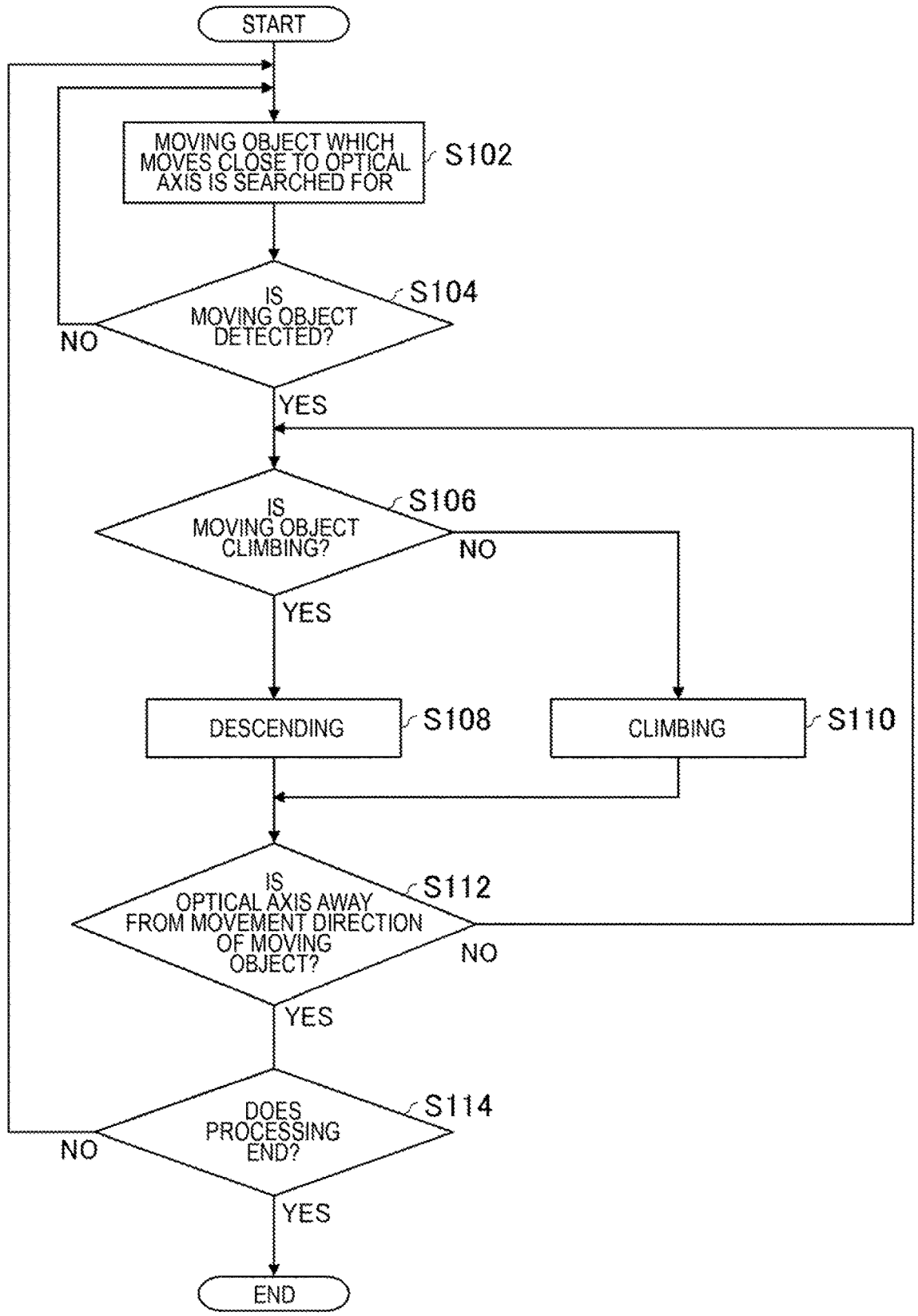
FIG. 5 schematically shows an example of a flow of processing by the unmanned aerial vehicle 100.

FIG. 5 schematically shows an example of a flow of processing by the unmanned aerial vehicle 100. Here, a state in which the own aerial vehicle is executing the optical wireless communication with the communication partner's aerial vehicle and periodically shares the object information will be described as a start state.

In step 102 (a step may be abbreviated as S), based on the shared object information, the movement control unit 132 searches for a moving object which moves close to the optical axis 115 of the optical wireless communication unit 114 between the own aerial vehicle and the communication partner's aerial vehicle. If the moving object is detected (YES in S104), the processing proceeds to S106, and if the moving object is not detected (NO in S104), the processing returns to S102.

In 5106, the movement control unit 132 determines whether the moving object is climbing. If it is determined that the moving object is climbing, the processing proceeds to S108, and if it is determined that the moving object is not climbing, the processing proceeds to S110. In S108, the movement control unit 132 causes the own aerial vehicle to descend. At this time, the communication partner's aerial vehicle also causes itself to descend. In S110, the movement control unit 132 causes the own aerial vehicle to climb. At this time, the communication partner's aerial vehicle also causes itself to climb. In this way, by the movement of the own aerial vehicle and the communication partner's aerial vehicle in a direction opposite to a climbing and descending direction of the moving object, it is possible to suppress an occurrence of a situation in which the blocking is avoided first, and then the aircraft 210 comes close to the optical axis 115 again.

In S112, the movement control unit 132 determines whether the optical axis 115 is away from the movement direction of the moving object. If it is determined that the optical axis 115 is not away, the processing returns to S106, and if it is determined that the optical axis 115 is away, the processing proceeds to S114.

In S114, the movement control unit 132 determines whether to end the processing for avoiding the blocking of the optical axis 115. For example, the movement control unit 132 determines an end if an instruction to end is received, and determines not to end if the instruction to end is not received. If it is determined that the processing does not end, the processing returns to S102.

Figure 6:
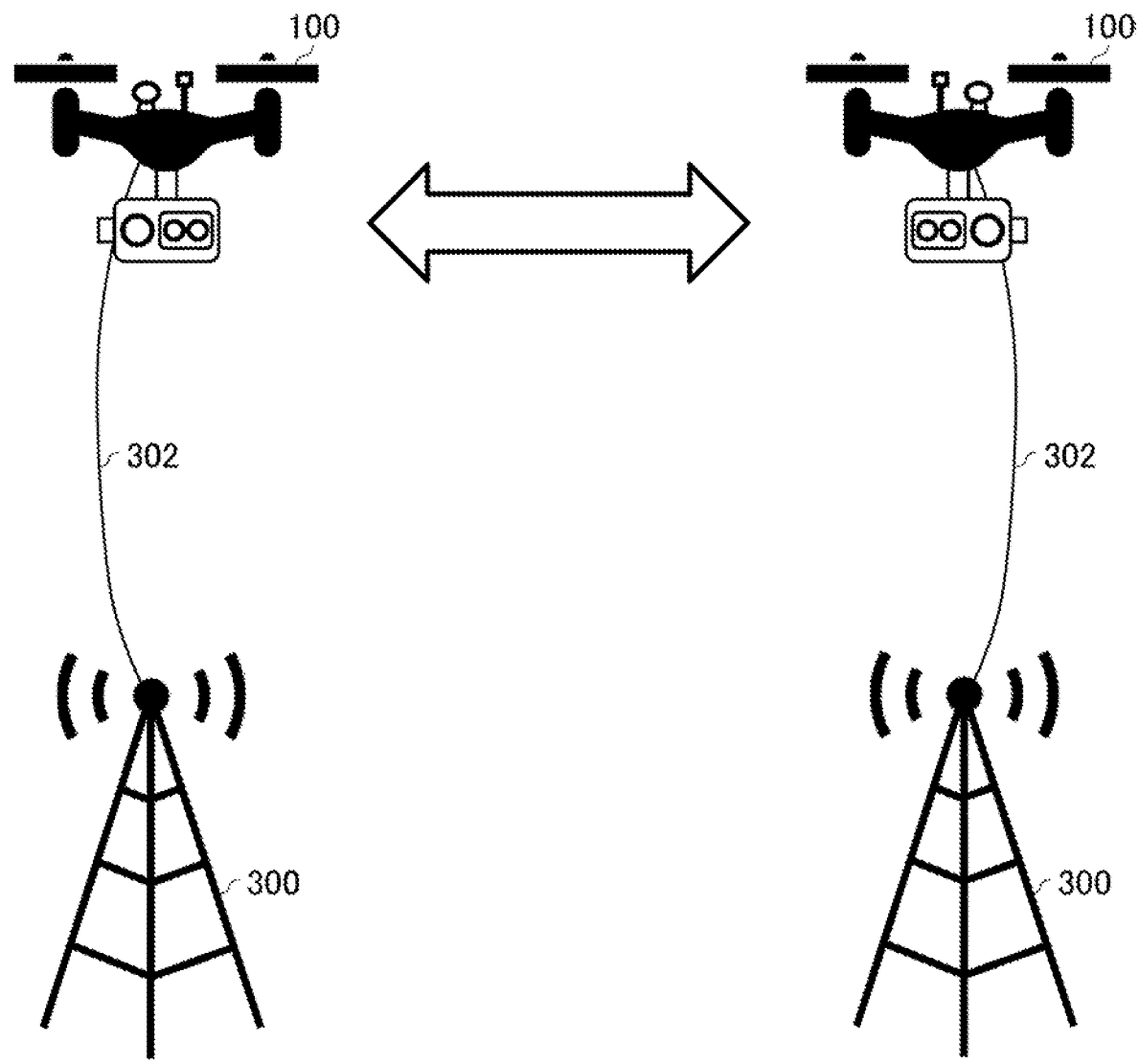
FIG. 6 schematically shows an example of a system 30.

FIG. 6 schematically shows an example of a system 30. The system 30 includes a plurality of unmanned aerial vehicles 100, and a plurality of wireless base stations 300, each of which is connected to the unmanned aerial vehicle 100 via a cable 302. FIG. 6 illustrates a case where the system 30 includes two sets of a first unmanned aerial vehicle 100 and a first wireless base station 300, and a second unmanned aerial vehicle 100 and a second wireless base station 300.

The first unmanned aerial vehicle 100 executes the optical wireless communication with the second unmanned aerial vehicle 100. The first unmanned aerial vehicle 100 communicates with the second wireless base station 300 via the optical wireless communication, which is performed by the first unmanned aerial vehicle 100, with the second unmanned aerial vehicle 100. In this way, by the first wireless base station 300 and the second wireless base station 300 being configured to communicate with each other via the optical wireless communication between the first unmanned aerial vehicle 100 and the second unmanned aerial vehicle 100, it is possible to install the first wireless base station 300 and the second wireless base station 300 in a place where it is difficult to lay a cable between the first wireless base station 300 and the second wireless base station 300.

By installing a fixed optical wireless communication unit in each of the first wireless base station 300 and the second wireless base station 300, the first wireless base station 300 and the second wireless base station 300 can also be able to communicate with each other; however, in that case, when the object such as a bird or an unmanned aerial vehicle is located on the optical axis of the optical wireless communication unit, the communication between the first wireless base station 300 and the second wireless base station 300 is cut off. In contrast to this, with the first unmanned aerial vehicle 100 and the second unmanned aerial vehicle 100 according to the present embodiment, by the appropriate movement such that the object is not located on the optical axis of the optical wireless communication, it is possible to maintain the communication between the first wireless base station 300 and the second wireless base station 300.

It should be noted that FIG. 6 shows the example in which each of the two unmanned aerial vehicles 100 is connected to the wireless base station 300 via the cable 302; however, the present invention is not limited to this. For example, one unmanned aerial vehicle 100 is connected to the wireless base station 300 via the cable 302, and the other unmanned aerial vehicle 100 is connected to a ship via the cable 302. In this way, it is possible to realize the communication between the wireless base station 300 and the ship via the optical wireless communication of the unmanned aerial vehicle 100. The two unmanned aerial vehicles 100 may respectively be connected to any target to which the communication is desired to be executed.

Figure 7:
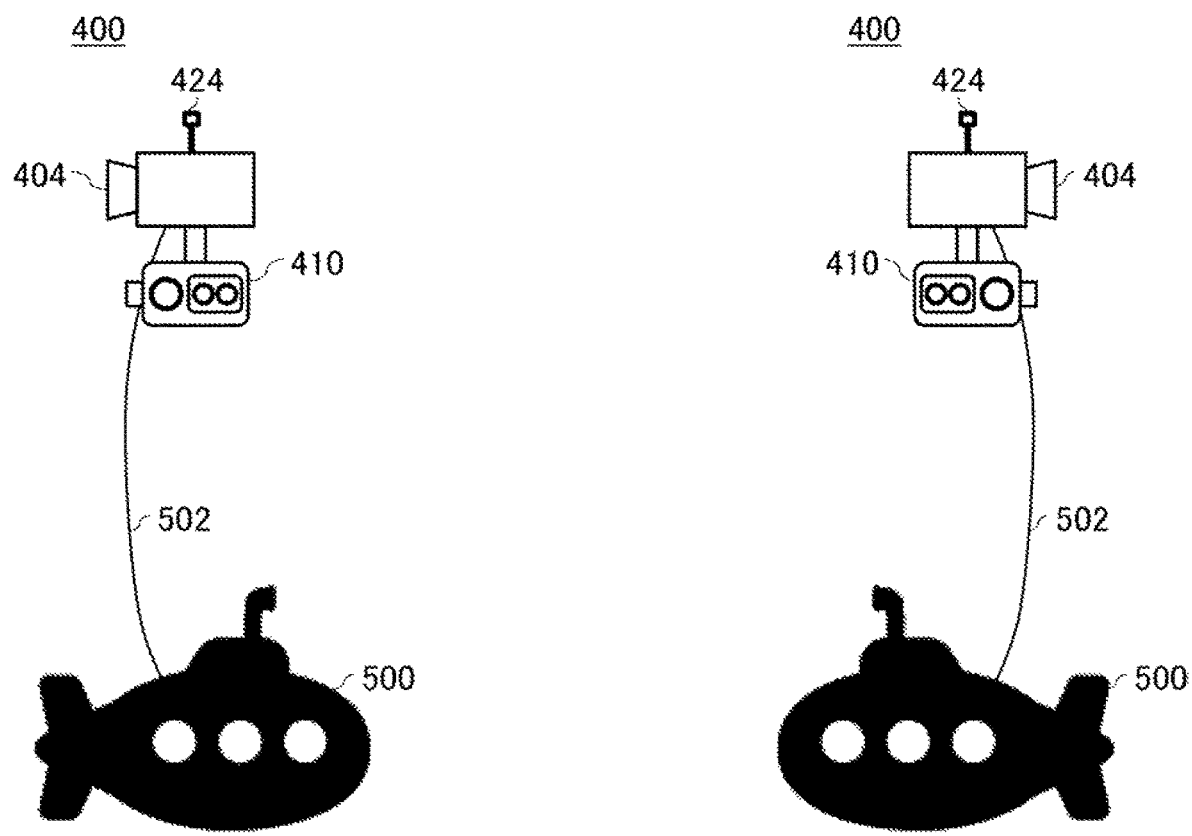
FIG. 7 schematically shows an example of an underwater moving body 400.

FIG. 7 schematically shows an example of an underwater moving body 400. In FIG. 1 to FIG. 6, the unmanned aerial vehicle 100 is mainly mentioned as an example of the moving body; however, the present invention is not limited to this. Examples of the moving body include an airplane, a helicopter, an automobile, and the like. In addition, as shown in FIG. 7, the underwater moving body 400 that moves underwater is also mentioned as an example.

The underwater moving body 400 includes an underwater moving mechanism 404, a communication unit 410, and underwater LiDAR 424. The communication unit 410 may be similar to the communication unit 110.

In addition, the underwater moving body 400 includes a GNSS unit, an acceleration sensor, a gyro sensor, and a control device (not shown). The GNSS unit, the acceleration sensor, the gyro sensor, and the control device may be similar to the GNSS unit 120, the acceleration sensor 121, the gyro sensor 122, and the control device 130.

The underwater moving body 400 can operate similarly to the unmanned aerial vehicle 100. The underwater moving body 400 executes an optical wireless communication with another underwater moving body 400. The underwater moving body 400 transmits, to the other underwater moving body 400, object information of an object around the underwater moving body 400 by the optical wireless communication, and receives, from the other underwater moving body 400, object information of an object around the other underwater moving body 400 by the optical wireless communication, and thereby sharing the object information. Based on the shared object information, the underwater moving body 400 controls a movement of the underwater moving body 400 such that the object is not located on the optical axis of the optical wireless communication.

For example, as shown in FIG. 7, the underwater moving body 400 is connected to a submersible 500 via a cable 502. The submersible 500 to which the underwater moving body 400 is connected can communicate with another submersible 500 via the underwater moving body 400. An underwater communication by radio waves is difficult to realize; however, with the underwater moving body 400 according to the present embodiment, it is possible to cause underwater devices such as the submersible 500 to easily communicate with each other.

Figure 8:
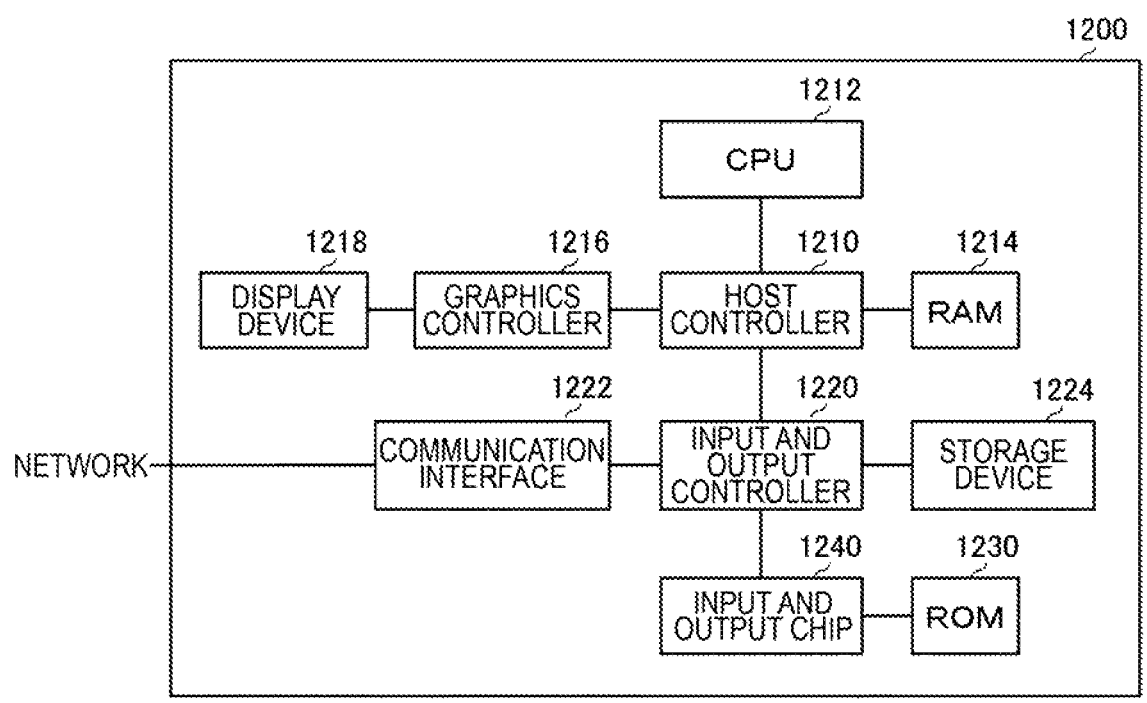
FIG. 8 schematically shows an example of a hardware configuration of a computer 1200 that functions as a control device 130.

FIG. 8 schematically shows an example of a hardware configuration of a computer 1200 that functions as a control device 130. A program installed on the computer 1200 can cause the computer 1200 to function as one or more "units" of the apparatuses according to the present embodiment, or can cause the computer 1200 to execute operations or one or more "units" associated with the apparatuses according to the present embodiment, and/or cause the computer 1200 to execute processes or steps of the processes according to the present embodiment. Such a program may be executed by a CPU 1212 so as to cause the computer 1200 to execute the specific operation associated with some or all of the blocks of flowcharts and block diagrams described in the present specification.

The computer 1200 according to the present embodiment includes the CPU 1212, a RAM 1214, and a graphics controller 1216, which are interconnected by a host controller 1210. The computer 1200 also includes a communication interface 1222, a storage device 1224, and an input and output unit such as an IC card drive, which are connected to the host controller 1210 via an input and output controller 1220. The storage device 1224 may be a hard disk drive, a solid-state drive, and the like. The computer 1200 also includes a ROM 1230, and a legacy input and output unit such as a keyboard, which are connected to the input and output controller 1220 via an input and output chip 1240.

The CPU 1212 operates according to the programs stored in the ROM 1230 and the RAM 1214, thereby controlling each unit. The graphics controller 1216 obtains image data generated by the CPU 1212 on a frame buffer or the like provided in the RAM 1214 or in the graphics controller 1216 itself, and causes the image data to be displayed on the display device 1218.

The communication interface 1222 communicates with other electronic devices via a network. The storage device 1224 stores programs and data used by the CPU 1212 in the computer 1200. The IC card drive reads the programs and the data from an IC card, and/or writes the programs and the data to the IC card.

The ROM 1230 stores, in itself, a boot program or the like that is executed by the computer 1200 during activation, and/or a program that depends on hardware of the computer 1200. The input and output chip 1240 may also connect various input and output units to the input and output controller 1220 via a USB port, a parallel port, a serial port, a keyboard port, a mouse port, and the like.

The program is provided by a computer-readable storage medium such as the IC card. The program is read from the computer-readable storage medium, installed in the storage device 1224, the RAM 1214, or the ROM 1230, which is also an example of the computer-readable storage medium, and executed by the CPU 1212. Information processing written in these programs is read by the computer 1200, resulting in cooperation between a program and the above-mentioned various types of hardware resources. An apparatus or a method may be constituted by realizing the operation or process of the information according to the use of the computer 1200.

For example, when a communication is executed between the computer 1200 and an external device, the CPU 1212 may execute a communication program loaded in the RAM 1214, and instruct the communication interface 1222 to process the communication based on the processing written in the communication program. Under the control of the CPU 1212, the communication interface 1222 reads transmission data stored in a transmission buffer region provided in a recording medium such as the RAM 1214, the storage device 1224, or the IC card, transmits the read transmission data to the network, or writes received data which is received from the network to a receiving buffer region or the like provided on the recording medium.

In addition, the CPU 1212 may cause all or a necessary portion of a file or a database to be read into the RAM 1214, the file or the database having been stored in an external recording medium such as the storage device 1224, the IC card, etc., and execute various types of processing on the data on the RAM 1214. Then, the CPU 1212 may write back the processed data to the external recording medium.

Various types of information such as various types of programs, data, tables, and databases may be stored in recording media to undergo information processing. The CPU 1212 may execute various types of processing on the data read from the RAM 1214 to write back a result to the RAM 1214, the processing being described throughout the present disclosure, specified by instruction sequences of the programs, and including various types of operations, information processing, condition determinations, conditional branching, unconditional branching, information retrievals/replacements, or the like. In addition, the CPU 1212 may search for information in the file, the database, or the like in the recording medium. For example, when a plurality of entries each having an attribute value of a first attribute associated with an attribute value of a second attribute are stored in the recording medium, the CPU 1212 may search, from the plurality of entries, for an entry that matches a condition in which the attribute value of the first attribute is specified, and read the attribute value of the second attribute stored in the entry, thereby acquiring the attribute value of the second attribute associated with the first attribute that satisfies a predetermined condition.

The program or software module described above may be stored in a computer-readable storage medium on the computer 1200 or near the computer 1200. In addition, a recording medium such as a hard disk or a RAM provided in a server system connected to a dedicated communication network or the Internet can be used as a computer-readable storage medium, thereby providing the program to the computer 1200 via the network.

Blocks in the flowcharts and block diagrams of the present embodiment may represent steps of processes in which operations are performed or "units" of apparatuses responsible for performing operations. Certain steps and "units" may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., for example, such as field-programmable gate arrays (FPGA), programmable logic arrays (PLA), etc.

A computer-readable storage medium may include any tangible device that can store instructions to be executed by a suitable device, and as a result, the computer-readable storage medium having instructions stored in the tangible device comprises an article of manufacture including instructions which can be executed to create means for executing operations specified in the flowcharts or block diagrams. Examples of the computer-readable storage medium may include an electronic storage medium, a magnetic storage medium, an optical storage medium, an electromagnetic storage medium, a semiconductor storage medium, etc. More specific examples of the computer-readable storage medium may include a floppy (registered trademark) disk, a diskette, a hard disk, a random access memory (RAM), a read-only memory (ROM), an erasable programmable read-only memory (EPROM or Flash memory (registered trademark)), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc., such that it is possible for the processor of the general-purpose computer, special purpose computer, or other programmable data processing apparatus, or for programmable circuitry to execute the computer-readable instructions to create means for performing operations specified in the flowcharts or block diagrams. Examples of the processor include a computer processor, a processing unit, a microprocessor, a digital signal processor, a controller, a microcontroller, and the like.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 30 system, 100 unmanned aerial vehicle, 102 main body unit, 104 propeller, 106 leg unit, 108 gimbal, 110 communication unit, 112 camera, 114 optical wireless communication unit, 115 optical axis, 116 light emitting port, 118 light receiving port, 120 GNSS unit, 121 acceleration sensor, 122 gyro sensor, 123 millimeter wave radar, 124 LiDAR, 130 control device, 132 movement control unit, 134 communication control unit, 136 object detection unit, 210 aircraft, 220 vehicle, 230 wall, 300 wireless base station, 302 cable, 400 underwater moving body, 404 underwater moving mechanism, 410 communication unit, 424 underwater LiDAR, 500 submersible, 502 cable, 1200 computer, 1210 host controller, 1212 CPU, 1214 RAM, 1216 graphics controller, 1218 display device, 1220 input and output controller, 1222 communication interface, 1224 storage device, 1230 ROM, 1240 input and output chip

What is claimed is:

1. A moving body comprising:
    an optical wireless communication unit configured to execute an optical wireless communication with another moving body;
    an object detection unit configured to detect an object around an own moving body;
    an object information transmission unit configured to transmit, to the other moving body, first object information including location information of the object, by the optical wireless communication or a radio wave communication;
    an object information receiving unit configured to receive, from the other moving body, second object information including location information of an object around the other moving body, by the optical wireless communication or the radio wave communication; and
    a movement control unit configured to control, based on the first object information and the second object information, a movement of the own moving body such that an object is not located on an optical axis of the optical wireless communication.

2. The moving body according to claim 1, wherein the object detection unit is configured to detect the object around the own moving body by using at least any of a camera, radar, LiDAR, sonar, and an ultrasonic sensor.

3. The moving body according to claim 2, wherein
    the object information transmission unit is configured to transmit, to the other moving body, the first object information including the location information indicating a relative location of the object with the own moving body as a starting point, by the optical wireless communication or the radio wave communication.

4. The moving body according to claim 2, wherein
    the object detection unit is configured to detect a movement state of the object, and
    the object information transmission unit is configured to transmit, to the other moving body, the first object information including the location information of the object and the movement state of the object, by the optical wireless communication or the radio wave communication.

5. The moving body according to claim 2, wherein
    the movement control unit is configured to control, based on a location and a movement direction of an approaching object that is an object which is predicted to enter the optical axis of the optical wireless communication, the movement of the own moving body such that the approaching object is not located on the optical axis of the optical wireless communication.

6. The moving body according to claim 2, the moving body being an unmanned aerial vehicle.

7. The moving body according to claim 2, the moving body being an underwater moving body configured to move underwater.

8. A system comprising:
    the moving body according to claim 2; and
    a first wireless base station that is connected to the moving body via a cable, wherein
    the first wireless base station is configured to communicate with a second wireless base station that is connected to the other moving body via the cable, via the optical wireless communication, which is performed by the moving body, with the other moving body.

9. The moving body according to claim 1, wherein the object information transmission unit is configured to transmit, to the other moving body, the first object information including the location information indicating a relative location of the object with the own moving body as a starting point, by the optical wireless communication or the radio wave communication.

10. The moving body according to claim 9, wherein
the object detection unit is configured to detect a movement state of the object, and
the object information transmission unit is configured to transmit, to the other moving body, the first object information including the location information of the object and the movement state of the object, by the optical wireless communication or the radio wave communication.

11. The moving body according to claim 1, wherein
the object detection unit is configured to detect a movement state of the object, and
the object information transmission unit is configured to transmit, to the other moving body, the first object information including the location information of the object and the movement state of the object, by the optical wireless communication or the radio wave communication.

12. The moving body according to claim 11, wherein
the object detection unit is configured to detect a movement direction or a movement speed of the object, and
the object information transmission unit is configured to transmit, to the other moving body, the first object information including the location information of the object, and the movement direction and the movement speed of the object, by the optical wireless communication or the radio wave communication.

13. The moving body according to claim 1, wherein
the movement control unit is configured to control, based on a location and a movement direction of an approaching object that is an object which is predicted to enter the optical axis of the optical wireless communication, the movement of the own moving body such that the approaching object is not located on the optical axis of the optical wireless communication.

14. The moving body according to claim 13, wherein
the movement control unit is configured to decide which one, between the own moving body and the other moving body, moves by communicating with the other moving body by the optical wireless communication or the radio wave communication, and the movement control unit is configured to control, when deciding that the own moving body moves, the movement of the own moving body such that the approaching object is not located on the optical axis of the optical wireless communication.

15. The moving body according to claim 14, wherein
the movement control unit is configured to decide which one, between the own moving body and the other moving body, moves based on the location and the movement direction of the approaching object, a location relationship between the own moving body and the object around the own moving body, and a location relationship between the other moving body and the object around the other moving body.

16. The moving body according to claim 1, the moving body being an unmanned aerial vehicle.

17. The moving body according to claim 1, the moving body being an underwater moving body configured to move underwater.

18. A system comprising:
the moving body according to claim 1; and
a first wireless base station that is connected to the moving body via a cable, wherein
the first wireless base station is configured to communicate with a second wireless base station that is connected to the other moving body via the cable, via the optical wireless communication, which is performed by the moving body, with the other moving body.

19. A computer non-transitory computer-readable recording medium having a program recorded thereon, for causing a moving body to function as:
an optical wireless communication unit configured to execute an optical wireless communication with another moving body;
an object detection unit configured to detect an object around an own moving body;
an object information transmission unit configured to transmit, to the other moving body, first object information including location information of the object, by the optical wireless communication or a radio wave communication;
an object information receiving unit configured to receive, from the other moving body, second object information including location information of an object around the other moving body, by the optical wireless communication or the radio wave communication; and
a movement control unit configured to control, based on the first object information and the second object information, a movement of the own moving body such that an object is not located on an optical axis of the optical wireless communication.

20. A control method that is executed by a computer which is mounted on a moving body, the control method comprising:
detecting an object around an own moving body;
transmitting, to another moving body, first object information including location information of the object, by an optical wireless communication or a radio wave communication;
receiving, from the other moving body, second object information including location information of an object around the other moving body, by the optical wireless communication or the radio wave communication; and
controlling, based on the first object information and the second object information, a movement of the own moving body such that an object is not located on an optical axis of the optical wireless communication.

* * * * *